United States Patent
Kacin et al.

(10) Patent No.: US 9,323,778 B2
(45) Date of Patent: Apr. 26, 2016

(54) VIRTUAL DISK UTILITY

(75) Inventors: Martin Kacin, Palo Alto, CA (US);
Kirk L. Reistroffer, Fremont, CA (US);
Michael R. Gray, Dublin, OH (US)

(73) Assignee: DELL PRODUCTS L.P., Round Rock, TX (US)

( * ) Notice: Subject to any disclaimer, the term of this patent is extended or adjusted under 35 U.S.C. 154(b) by 777 days.

(21) Appl. No.: 13/081,335

(22) Filed: Apr. 6, 2011

(65) Prior Publication Data

US 2012/0259900 A1 Oct. 11, 2012

(51) Int. Cl.
*G06F 17/30* (2006.01)
*G06F 11/07* (2006.01)

(52) U.S. Cl.
CPC ...... *G06F 17/30233* (2013.01); *G06F 11/0712* (2013.01); *G06F 11/0727* (2013.01)

(58) Field of Classification Search
CPC ............ G06F 11/0712; G06F 11/0727; G06F 9/45533; G06F 17/30233
See application file for complete search history.

(56) References Cited

U.S. PATENT DOCUMENTS

| | | | |
|---|---|---|---|
| 6,735,601 B1 * | 5/2004 | Subrahmanyam | 707/999.2 |
| 7,596,376 B2 | 9/2009 | Calhoun et al. | |
| 2004/0002942 A1 * | 1/2004 | Pudipeddi et al. | 707/1 |
| 2005/0108521 A1 * | 5/2005 | Silhavy et al. | 713/156 |
| 2008/0077711 A1 * | 3/2008 | Cepulis | 709/250 |
| 2008/0250222 A1 * | 10/2008 | Gokhale et al. | 711/203 |
| 2011/0040812 A1 * | 2/2011 | Phillips | 707/822 |
| 2011/0047195 A1 * | 2/2011 | Le et al. | 707/827 |
| 2011/0107327 A1 * | 5/2011 | Barkie et al. | 717/176 |

OTHER PUBLICATIONS

"Eraser Portable," http://portableapps.com/apps/utilities/eraser_portable, downloaded Jan. 13, 2011, 2009.
"Virtual Disk Image," http://en.wikipedia.org/wiki/Virtual_disk_image, downloaded Oct. 28, 2010.
"VMware Workstation," http://en.wikipedia.org/wiki/VMware_Workstation, downloaded Oct. 28, 2010.
"Xen Users' Manual," http://tx.downloads.xensource.com/downloads/docs/user/, downloaded Oct. 28, 2010 , 2005.
Mozilla Firefox, Portable Edition, http://portableapps.com/apps/internet/firefox_portable, downloaded Jan. 13, 2011.

(Continued)

*Primary Examiner* — Shew-Fen Lin
(74) *Attorney, Agent, or Firm* — Baker Botts L.L.P.

(57) ABSTRACT

In particular embodiments, a method comprising, by one or more computing devices, installing an application on a portion of a physical disk system of a first platform, virtualizing the portion of the physical disk system into a virtual disk system, comprising, storing data in the portion of the physical disk system in a database of the virtual disk system, providing an interface to access the data stored in the database, and providing a plurality sets of drivers for a plurality of platforms, wherein each set of drivers supports native operations with respect to the portion of the physical disk system on a different one of the plurality of platforms, mounting the virtual disk system on a second platform, and executing the application on the second platform, wherein all operations in connection with executing the application are contained within the virtual disk system mounted on the second platform.

7 Claims, 5 Drawing Sheets

(56) References Cited

OTHER PUBLICATIONS

"VMware Server," http://en.wikipedia.org/wiki/VMware_Server, downloaded Oct. 28, 2010.
"VirtualBox," http://en.wikipedia.org/wiki/VDI_(file_format), downloaded Oct. 28, 2010.
"Pick a PC. Any PC.," http://portableapps.com/, downloaded Jan. 13, 2011.
"VMware Fusion," http://en.wikipedia.org/wiki/VMware_Fusion, downloaded Oct. 28, 2010.

* cited by examiner

VIRTUAL DISK UTILITY

TECHNICAL FIELD

The present disclosure generally relates to cross-platform storage of data and more specifically relates to managing and storing data in a secure and portable manner.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a computer network connection. In particular, certain information handling systems may be designed to monitor, configure, and adjust the features, functionality, and software of other information handling systems by communicating with those information handling systems over a network connection. For example, one information handling system might be configured to manage the installation and updating of software on several other information handling systems.

In the context of the present disclosure, the term "network appliance" may refer to any device, such as an information handling system, which may include a combination of hardware, firmware, and/or software, that is capable of performing a set of operations or functions in connection with or over a computer network. The actual set of operations or functions a specific network appliance is capable of performing often depends on the hardware, firmware, and/or software included in that appliance. In the very least, however, a network appliance should be capable of being connected to a computer network.

System management appliances automate file distribution over a network and are available to save time for systems administration professionals and to save money for their companies. System administration professionals seeking to distribute licensed software and systems over a network to many network resources are often constrained by complex, time-consuming, and non-automated deployment. Performing system and software deployment has become increasingly challenging and time-consuming across diverse network, hardware, and software platforms.

Programs are available that archive, backup, and virtualize file systems, such as WinZip, Apple Disk Image, and VMware. Each of these programs use various methods to compress and encrypt platform-specific files. Each of these file systems that are created have various issues. For example, WinZip is considered an archival method, not a virtualization method. Even though .zip files may be transported between various computing devices on a network, the .zip files cannot be mounted and constituent files cannot be directly updated in place. In order for .zip files to be updated, they must first be extracted to a local copy and then replaced into the .zip file. Apple Disk Image backs up data in a copy but performs more like an archival method as opposed to a virtualization method. Further, Apple Disk Image has compatibility issues. For example, an Apple Disk Image, or a .dmg disk image, works only on Mac OS X and has a fixed size set at creation time, as it is essentially a raw disk image, or a backup copy of a hard disk. VMware also has compatibility issues. For example, a VMware virtual disk system created using Windows can be stored as files on a host computer or on a remote storage device but can only be accessed by a Windows machine. Thus, such file systems do not aid systems administration professionals who seek to deploy files across diverse network, hardware, and software platforms.

There are continuous efforts to improve the quality of the cross-platform file distribution over a network. Developers strive to improve file distribution management by reducing processing time and increasing network efficiency.

SUMMARY

The present disclosure generally relates to cross-platform storage of data and more specifically relates to managing and storing data in a secure and portable manner.

In particular embodiments, a method comprising, by one or more computing devices, installing an application on a portion of a physical disk system of a first platform, virtualizing the portion of the physical disk system into a virtual disk system, comprising, storing data in the portion of the physical disk system in a database of the virtual disk system, providing an interface to access the data stored in the database, and providing a plurality sets of drivers for a plurality of platforms, wherein each set of drivers supports native operations with respect to the portion of the physical disk system on a different one of the plurality of platforms, mounting the virtual disk system on a second platform, and executing the application on the second platform, wherein all operations in connection with executing the application are contained within the virtual disk system mounted on the second platform.

These and other features, aspects, and advantages of the disclosure are described in more detail below in the detailed description and in conjunction with the following figures.

DESCRIPTION OF EXAMPLE EMBODIMENTS

Figure 1:
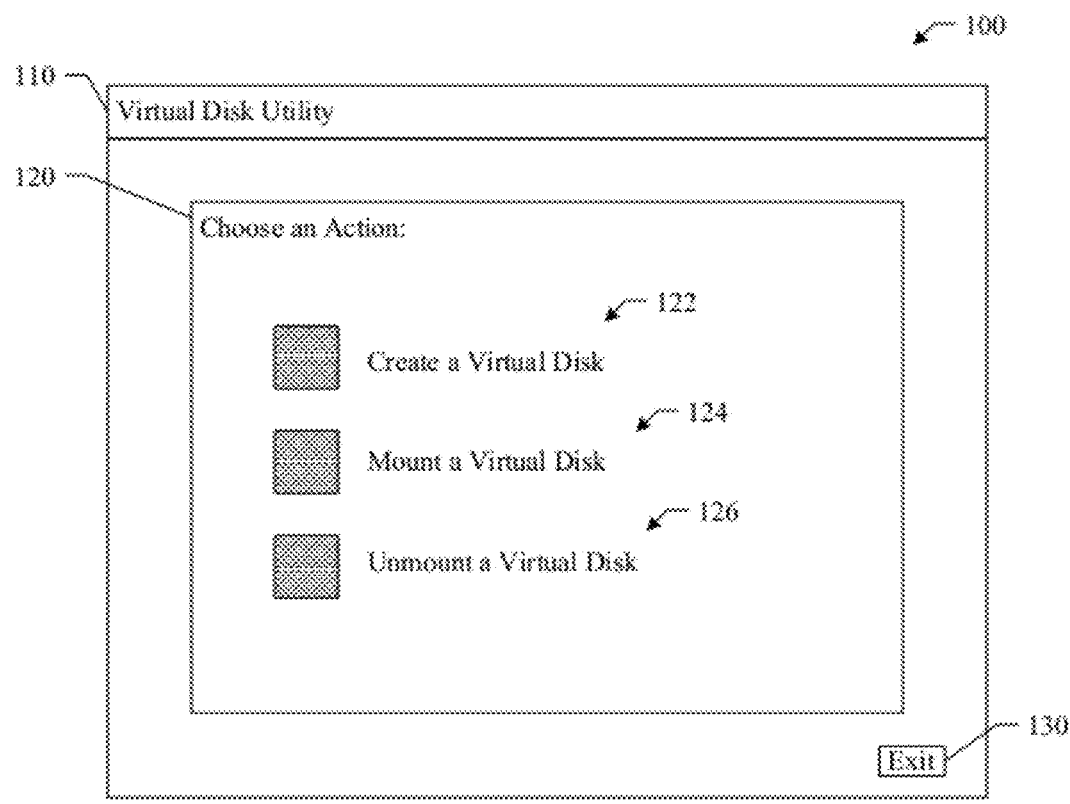
FIG. 1 illustrates an example user interface.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

System management appliances automate file distribution over a network and are available to save time for systems administration professionals and to save money for their companies. System administration professionals seeking to distribute licensed software and systems over a network to many network resources are often constrained by complex, time-consuming, and non-automated deployment. Performing system and software deployment has become increasingly challenging and time-consuming across diverse network, hardware, and software platforms. Virtual disk systems may be used to distribute license software and systems over a network to many network resources, but may also be used for many other applications. This specification contemplates the usage of virtual disk systems for many other usage in addition to the particular example of usage described in this specification.

Programs are available that archive, backup, and virtualize file systems, such as WinZip, Apple Disk Image, and VMware. Each of these programs use various methods to compress and encrypt platform-specific files. Each of these file systems that are created have various issues. For example, WinZip is considered an archival method, not a virtualization method. Even though .zip files may be transported between various computing devices on a network, the .zip files cannot be mounted and constituent files cannot be directly updated in place. In order for .zip files to be updated, they must first be extracted to a local copy and then replaced into the .zip file. Apple Disk Image backs up data in a copy but performs more like an archival method as opposed to a virtualization method. Further, Apple Disk Image has compatibility issues. For example, an Apple Disk Image, or a .dmg disk image, works only on Mac OS X and has a fixed size set at creation time, as it is essentially a raw disk image, or a backup copy of a hard disk. VMware also has compatibility issues. For example, a VMware virtual disk system created using Windows can be stored as files on a host computer or on a remote storage device but can only be accessed by a Windows machine. Thus, such file systems do not aid systems administration professionals who seek to deploy files across diverse network, hardware, and software platforms.

A virtual disk system represents a single file that simulates the operations of a file system, an application, or any software that resides on a physical disk system. A virtual disk system provides a means of storing and managing files and in a secure and portable manner. In particular embodiments, a virtual disk system may be used to email data, share data on a network, store data, as a data backup, to protect personal data, or for remote access of data. In particular embodiments, a virtual disk system may store an entire file system within a single file. A virtual disk system also provides a mountable, compressable, encryptable, cross-platform file system for the storage of data and documents. In particular embodiments, the virtual disk system may be encrypted with authorization required to access the data, thus providing security for sensitive data. In In particular embodiments, a virtual disk system utilizes an easy-to-use interface that allows a user to interact with the virtual disk system as the user would interact with any removable drive. In particular embodiments, for example, but not by way of limitation, an easy-to-use interface of the virtual disk system allows the user to create a virtual disk system on a computing device, mount an existing virtual disk system on a computing device, and unmount a virtual disk system from a computing device. In particular embodiments, an easy-to-use interface of the virtual disk system allows virtual disk systems to be mounted or unmounted by right-clicking on the files or drives that represent them.

FIG. 1 illustrates an example user interface 100. The user interface 100 is partitioned into several areas or components 110, 120, 130. Component 110 illustrates that the user interface is for a virtual disk system utility. Near the center, component 120 illustrates three tabs 122, 124, 126 that represent user options for managing the virtual disk system. If a user selects tab 122, a new virtual disk system will be created. If a user selects tab 124, an existing virtual disk system will be mounted. If a user selects tab 126, a virtual disk system that is currently mounted will be unmounted or disconnected. Component 130 illustrates that the user may exit the utility when management of the virtual disk system is complete.

In particular embodiments, when tab 122 is selected to create a new virtual disk system, the user may be prompted to enter additional information before the new virtual disk system is created. In particular embodiments, the user may be prompted to enter information such as, but not by way of limitation, a destination location where the virtual disk system will be stored, and a name for the virtual disk system. In particular embodiments, the user may be further prompted to enter information prior to the virtual disk system being created. For example, the user may be further prompted to enter a drive letter, where the virtual disk system be displayed in connection with a specific drive letter. In particular embodiments, the user may create a passcode or other means of authorization to restrict access to the virtual disk system.

In particular embodiments, once the virtual disk system is mounted, it will behave as a drive. For example, in Windows Explorer the mounted virtual disk system will be displayed in connection with a specific drive letter. For example, in Mac OS X the mounted virtual disk system will be appear in the Devices list within the Mac Finder.

In particular embodiments, when tab 124 is selected to mount an existing virtual disk system, the user may be prompted to enter additional information before the virtual disk system is mounted. In particular embodiments, the user may be prompted to enter information such as, but not by way of limitation, a virtual disk system to mount and a drive letter referencing the virtual disk system. In particular embodiments, the user may be prompted to enter a passcode or other means of authorization in order to access the virtual disk system for mounting. In particular embodiments, when tab 126 is selected to unmount an existing virtual disk system, the user may be prompted to enter additional information before the virtual disk system is unmounted. In particular embodiments, the user may be prompted to enter information such as, but not by way of limitation, a virtual disk system to unmount, and verification that this is in fact the correct virtual disk system that the user wishes to unmount. In particular embodiments, the user may be prompted to enter a passcode or other means of authorization in order to access the virtual disk system for unmounting.

Figure 2:
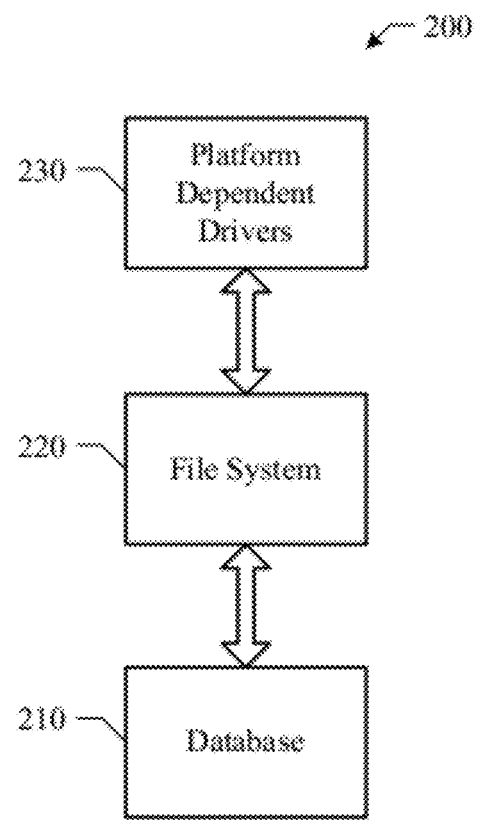
FIG. 2 illustrates an example virtualized disk system.

FIG. 2 illustrates an example virtual disk system. In particular embodiments an example virtual disk system comprises database 210, file system 220, and platform dependent drivers 230. In particular embodiments, a virtual disk system may be created using the method illustrated in FIG. 3.

In particular embodiments, database 210 may be a relational database, such as a SQL database. In particular embodiments, data stored in database 210 comprises the contents of one or more sets of data associated with a physical disk system and one or more attributes describing a structure of the physical disk system. In particular embodiments, database 210 comprises tables representing a hierarchical file system, file attributes, and blocks of file content. In particular embodiments, data stored in database 210 originates from a first platform. In particular embodiments, database 210 automatically expands and contracts to fit the set of data or the file system that it contains. In particular embodiments the size of database 210 may be subject to native storage space or a 2 terabyte (TB) SQLite upper bound.

In particular embodiments, file system 220 provides an interface for supporting access to the data stored in the database. In particular embodiments, file system 220 normalizes all attributes associated with a set of data associated with a physical disk system. Various operating systems have various requirements for attributes associated with a set of data. For example, the unpatented Windows FAT32 file system format is widely supported by non-Windows OS vendors but is not suitable for network transport, has a 4 gigabyte (GB) size limitation, and has file naming limitations. In particular embodiments, file system 220 may normalize any properties associated with a set of data other than the contents of the set of data, such as, for example, but not by way of limitation, path, name, value, size, or date and time in order for the data stored in the database to be accessible. More specifically, in particular embodiments, file system 220 normalizes file names so that the files are accessible for any platform.

In particular embodiments, file system 220 assembles the set of data for uniform access across all platforms. More specifically, file system 220 may assemble the set of data for operations such as open files, open directory, list all files in directory, read and write files, manipulate attributes of files. In particular embodiments, because the file name and/or file attributes are normalized, a computing device may perform operations of the physical disk system on the specific platform without requiring any additional operation from a computing system running the specific platform.

In particular embodiments, file system 220 utilizes a plurality of application programming interfaces (APIs) to normalize a set of data associated with the physical disk system. APPENDIX A illustrates an example routine utilized by file system 220 that corresponds to a custom application without mount point. Appendix B illustrates an example routine utilized by file system 220 that corresponds to a Filesystem in Userspace (FUSE) interface adaptor. In particular embodiments, the FUSE operation normalizes native OS filenames in passage to and from the OS native character set, path separator, etc. Additional FUSE operations are documented at http://www.ibm.com/developerworks/linux/library/l-fuse/#N10169, and are hereby incorporated by reference. Appendix C illustrates an example routine utilized by file system 220 that corresponds to the Dokan interface adaptor for Windows. In particular embodiments, the Dokan interface adaptor is utilized to create file systems that can be seen as normal file systems in Windows.

In particular embodiments, platform dependent drivers 230 comprise a plurality sets of drivers corresponding to a plurality of platforms respectively, wherein each set of drivers supports native operations with respect to the physical disk system on a different platform. In particular embodiments, platform specific drivers enable the virtual disk system to be mounted on the corresponding platform to retrieve the physical disk system.

In particular embodiments, each set of platform dependant drivers 230 support operations of the physical disk system on the specific platform without requiring any additional operation from a client running the specific platform. In particular embodiments a computing device may call specific file attributes viewable from the native platform by utilizing the platform dependant drivers 230.

Figure 3:
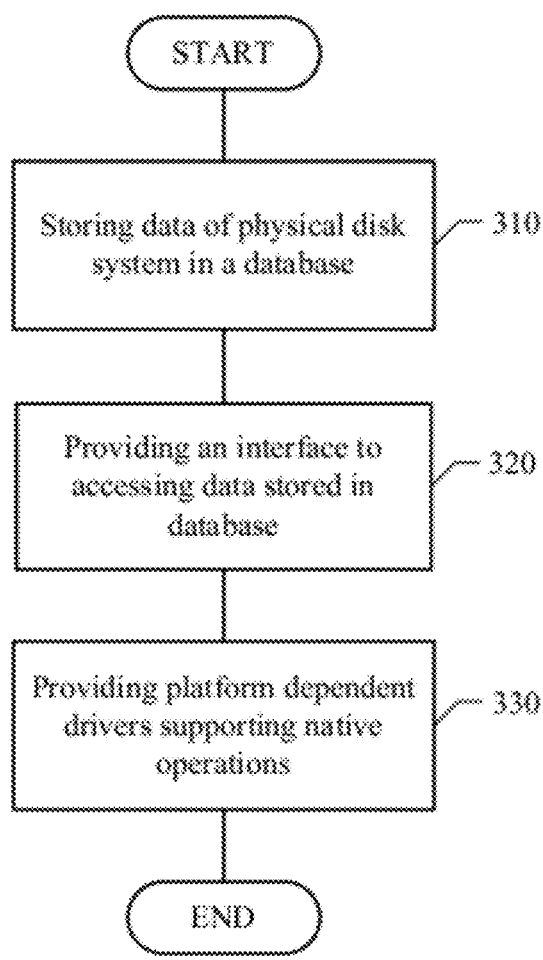
FIG. 3 illustrates an example method.

FIG. 3 illustrates an example method of virtualizing a physical disk system originating from a first platform. In particular embodiments, a user may initialize creation of a virtual disk system using a user interface, such as user interface 100 as illustrated in FIG. 1. The steps illustrated in FIG. 3 may be applied to any set of data associated with a physical disk system. Examples of sets of data may include, but are not limited to, raw data, files, programs, applications, or operating systems. To simplify the discussion, the steps illustrated in FIG. 3 are described for a single physical disk system. The same process may be used for any number of sets of data associated with physical disk systems.

In particular embodiments, a virtual disk system originates from a first platform. In particular embodiments, a first platform may be any one of a number of operating systems. Operating systems may be, for example, any of a number of operating systems including, but not by way of limitation, Microsoft Windows, Unix, Linux, BSD, Free BSD, Net BSD, Open BSD, Mac OS X, Plan 9, GNU, Google Chrome OS, Blackberry, Palm, Symbian, Android OS, or Windows Mobile.

In particular embodiments, data of a physical disk system is stored in a database, as illustrated in step 310. As described above, a database may be any database, such as database 210.

In particular embodiments, file system 220 provides an interface for supporting access to the data stored in the database, as illustrated in step 320. In particular embodiments, file system 220 generates a portable hierarchical file system that is platform neutral. In particular embodiments, a portable hierarchical file system that is platform neutral may be a .kvd file.

In particular embodiments, the virtual disk system provides platform dependent drivers 230, as illustrated in step 330. In particular embodiments, platform dependant drivers 230 enables the virtual disk system to be mounted on the corresponding platform to retrieve the physical disk system.

In particular embodiments, the virtual disk system may employ various encryption or compression for security and efficiency in transport. Particular embodiments of the virtual disk system may employ different levels of encryption depending on the sensitivity of the data within the virtual disk system. In particular embodiments, the user may select the level of encryption for the virtual disk system depending on the sensitivity of the data within the virtual disk system. In particular embodiments, the virtual disk may employ compression for efficiency in transport.

In particular embodiments, the virtual disk system may be transmitted between computing systems using hardware. In particular embodiments, the virtual disk system may be transmitted between computing systems over a network. Still in other particular embodiments, the virtual disk system may be stored for transport through other various means, such as a file transfer protocol (FTP) client, an HTTP site, or email. In particular embodiments, the virtual disk system may be mounted on a second platform to retrieve the physical disk system, where the operating system of the second platform is different from the operating system of the first platform. In particular embodiments the operating system of the second platform may be the same as the operating system of the first platform. Further, in particular embodiments, the virtual disk system may be mounted on any platform, including but not limited to, a desktop computing system, a cloud system, any device system, a mobile phone, or any other device containing a user interface that can access data on file systems.

In particular embodiments, specific platforms display the normalized file names or other attributes in native format to the second operating system.

In particular embodiments, the contents of the virtual disk system may be accessed natively according to the second platform. When the virtual disk system is accessed natively according to the second platform, the second platform uses the set of drivers corresponding to the second platform, such as platform specific drivers 230. In particular embodiments, the second platform can access the virtual disk system natively without modifying the physical disk system in any way or the contents of the physical disk system. In particular embodiments, the second platform can access the virtual disk system natively without requiring any support from the second platform itself.

In particular embodiments, multiple instances of the virtual disk system may be running concurrently on the same computing device or across many disparate systems. In particular embodiments, multiple instances of the virtual disk system may be accessible on the same computing device or across many disparate systems. Still, in particular embodiments, multiple instances of the virtual disk system may be managed by a single computing device or network appliance. In particular embodiments, multiple instances of the virtual disk system may be managed at the instance level. For example, multiple instances of the virtual disk system available across a network may be centrally managed either in aggregate or at the instance level.

In particular embodiments, the data of the virtual disk system may be synchronized between one or more computing devices or any other devices accessing data of the virtual disk system.

In particular embodiments, the virtual disk system may utilize a time bomb to cease access to the virtual disk system. A time bomb is a computer program that has been written in such a way that it will stop functioning after a certain fixed date or time is reached. In particular embodiments, when a time bomb has been deployed within the virtual disk system, a user may be denied access to the virtual disk system after a certain time period, based on the user's location, or based on other uses of the virtual disk system on the same network. For example, in particular embodiments time bombs may be deployed within the virtual disk system to meter the use of the virtual disk system or to maintain compliance with a license agreement or other terms of use for the virtual disk system.

In particular embodiments, the virtual disk system may be removed. In particular embodiments, when the user removes the virtual disk system, there are may be no orphaned files or registry entries left behind. In particular embodiments, removal of the virtual disk system may comprise complete removal of the virtual disk system. For example, once the virtual disk system as been removed, there may be no trace, no breadcrumb, and no possibility for data recovery by malicious software.

In particular embodiments, software applications may be isolated to a virtual disk system in order to prevent infection of a local network and computing devices. In particular embodiments, applications isolated to a virtual disk system may be distributed to computing systems connected by a local network. In particular embodiments, the virtual disk system may be utilized as an installer to enable the applications to be accessible by running the virtual disk system instead of installing the application locally to each computing system.

In particular embodiments, a software application isolated to the virtual disk system and any and all data associated with the application may remain completely partitioned from the operating system of the computing device or any other network device accessing the application from the virtual disk system. Particular embodiments of an application isolated to the virtual disk may keep the application's data separate from the configuration aspects of the application. For example, executables, binaries, libraries, and other data associated with application within the virtual disk system may remain separate from license keys, application options, bookmarks, and any other configuration aspects associated with the application.

In particular embodiments, software applications isolated to a virtual disk system may be monitored and controlled by systems administrators. For example, in particular embodiments, applications isolated to the virtual disk system may be moved from computing device to computing device, synchronized between one or more computing devices, or have time bombs deployed within them. In particular embodiments, when a time bomb has been deployed within the software application isolated to the virtual disk system, a user may be denied access to the application after a certain time period, based on the user's location, or based on other uses of the application on the same network. For example, in particular embodiments time bombs may be deployed within the software application isolated to the virtual disk system to meter the use of the application or to maintain compliance with the software license or other terms of use for the software application.

In particular embodiments, a web browser may be installed into a virtual disk system. A virtual disk comprising a web browser may be sent to a computing device to for a user to access through the computing device. When the virtual disk system is mounted on the computing device the web browser runs from the virtual disk system. Any and all reading or writing tasks associated with use of the web browser are directed to the virtual disk system. In a virtual disk system comprising a web browser, no files are accessing the actual file system of the computing device from which the virtual disk system is running. If the virtual disk file system becomes corrupted in any way, the managing computing system or network appliance may remotely shutdown and unmount the virtual disk system. The managing computing system or network appliance may then replace a refreshed virtual disk system comprising a web browser with a copy of the web browser that has not been corrupted.

In particular embodiments, for example, a network systems management appliance running on Free Berkeley Software Distribution (FreeBSD) may create a virtual disk, install an application, such as FireFox, a web browser, onto it and distribute the virtual disk over the network to remote desktop clients or other computing devices for local mounting to aid application containment and ease-of-use.

Figure 4:
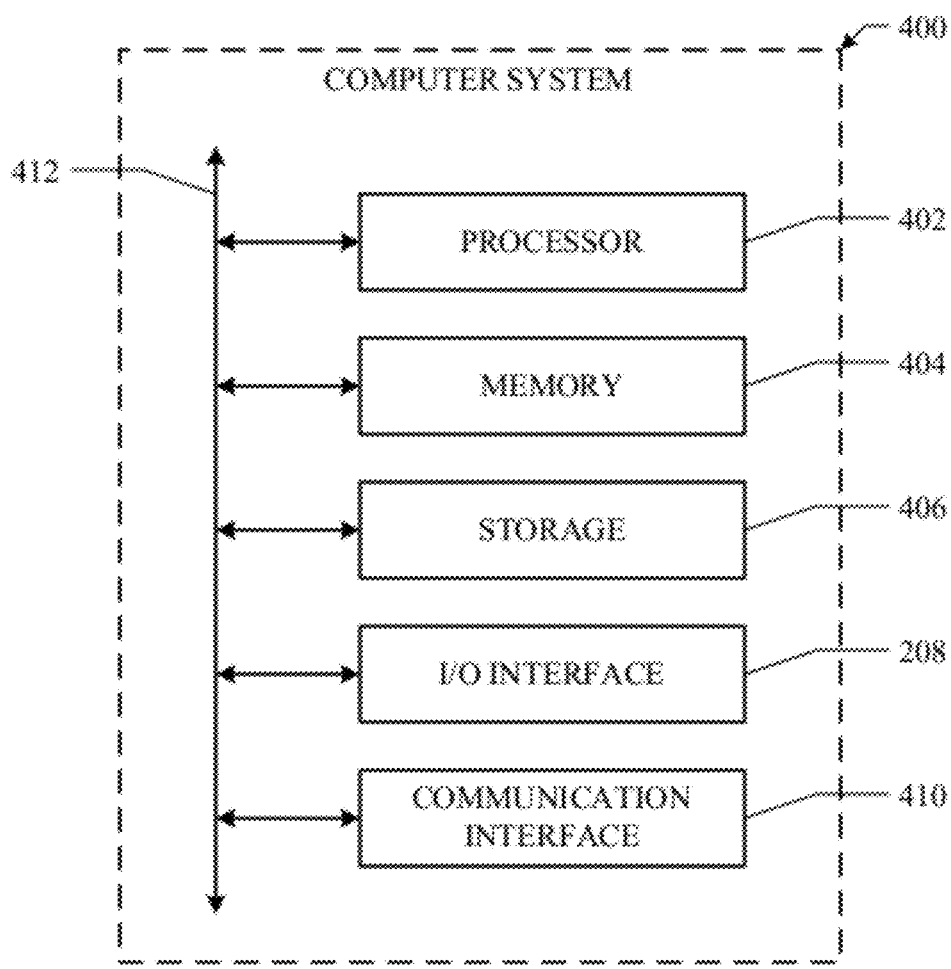
FIG. 4 illustrates an example computer system.

Particular embodiments may be implemented on one or more computer systems. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. The present disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. The present disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 5:
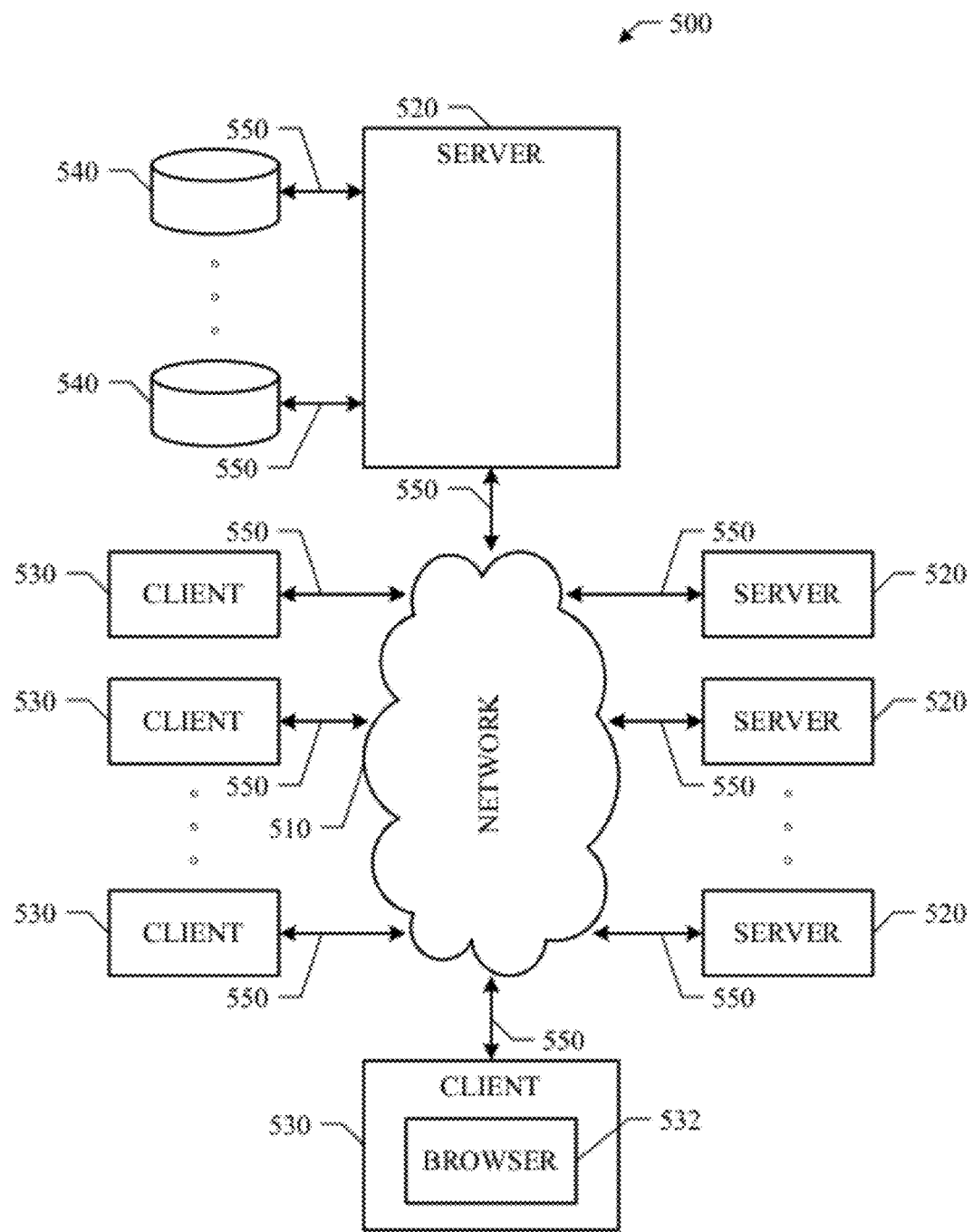
FIG. 5 illustrates an example network environment.

Particular embodiments may be implemented in a network environment. FIG. 5 illustrates an example network environment 500. Network environment 500 includes a network 510 coupling one or more servers 520 and one or more clients 530 to each other. In particular embodiments, network 510 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 510 or a combination of two or more such networks 510. The present disclosure contemplates any suitable network 510.

One or more links 550 couple servers 520 or clients 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a communications network, a satellite network, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, each client 530 may be an electronic device including hardware, software, or embedded logic components or a combination of two or more such components and capable of carrying out the appropriate functionalities implemented or supported by client 530. For example and without limitation, a client 530 may be a desktop computer system, a notebook computer system, a netbook computer system, a handheld electronic device, or a mobile telephone. A client 530 may enable a network user at client 530 to access network 510. A client 530 may have a web browser, such as Microsoft Internet Explorer or Mozilla Firefox, and may have one or more add-ons, plug-ins, or other extensions, such as Google Toolbar or Yahoo Toolbar. A client 530 may enable its user to communicate with other users at other clients 530. The present disclosure contemplates any suitable clients 530.

A client 530 may have a web browser 532, such as MICROSOFT INTERNET EXPLORER, GOOGLE CHROME or MOZILLA FIREFOX, and may have one or more add-ons, plug-ins, or other extensions. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

In particular embodiments, one or more data storages 540 may be communicatively linked to one or more servers 520 via one or more links 550. In particular embodiments, data storages 540 may be used to store various types of information. In particular embodiments, the information stored in data storages 540 may be organized according to specific data structures. Particular embodiments may provide interfaces that enable servers 520 or clients 530 to manage (e.g., retrieve, modify, add, or delete) the information stored in data storage 540.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

APPENDIX A

```
#if (defined(WIN32) || defined (_WIN32))
#include "stdafx.h"
#include <windows.h>
```

APPENDIX A-continued

```
#include <io.h>
#endif /* defined(WIN32) || defined (_WIN32) */
#include <stdio.h>
#include <string.h>
#include <stdlib.h>
#include <ctype.h>
#include "Kvd.h"
#if (defined(WIN32) || defined (_WIN32))
int ___cdecl _tmain(int argc, _TCHAR* argv[ ])
#else /* defined(WIN32) || defined (_WIN32) */
int main(int argc, char* argv[ ], char* envp[ ], char** exec_path)
#endif /* defined(WIN32) || defined (_WIN32) */
{
    int result = 0, i = 1, flags;
    mode_t mode = 0666;
    char pathBufr[256] = { "kirk" }, dataBufr[1024];
    uint64_t fileSize, offset = 0;
    KvdContext kvdCtx = NULL;
    char *key = NULL;
    int keyLength = 0;
    char *kvdStore = NULL, *kvdLabel = "KACE Demonstration
    KVD";
    KvdAccess kvdAccess;
    while ( i < argc ) {
        if ( argv[i] && argv[i][0] == '-' ) {
            if ( !strcmp(&argv[i][1], "kvdstore") &&
                i < argc - 1 && argv[i+1] && argv[i+1][0] ) {
                if (kvdStore != NULL )
                    free(kvdStore);
                if ( kvdStore = strdup(argv[i+1]) )
                    i++;
            } else if ( !strcmp(&argv[i][1], "key") ) { // Enable disk
            encryption.
                if ( i < argc - 1 &&
                    (keyLength = strlen(argv[i+1])) > 0 )
                    key = strdup(argv[++i]);
                else
                    keyLength = 0;
            } else ...
        }
        i++;
    }
}
if ( KvdFsStorageAccessible(kvdStore, key, &kvdAccess) &&
    (kvdCtx = KvdFsNew(kvdStore, kvdLabel, key, compress,
    clearLocks, FALSE)) ) {
    if ( flags = O_CREAT | O_RDWR,
        !(result = KvdFsCreate(kvdCtx, pathBufr, mode, flags,
        0)) ) { /* Create new file. */
        fileSize = 0;
    } else if ( flags = O_RDWR,
        !(result = KvdFsOpen(kvdCtx, pathBufr, flags)) )
        { /* Open existing file. */
        KvdFsGetattr(kvdCtx, pathBufr, &stbuf, NULL);
        fileSize = stbuf.st_size;
    } else
        result = 2;
    if ( !result ) {
        if ( !fileSize ) {
            memset(dataBufr, '?', sizeof(dataBufr));
            KvdFsWrite(kvdCtx, pathBufr, dataBufr,
            sizeof(dataBufr), offset);
        } else
            KvdFsRead(kvdCtx, pathBufr, dataBufr,
            sizeof(dataBufr), offset);
        KvdFsClose(kvdCtx, pathBufr);
        KvdFsUnlink(kvdCtx, pathBufr, TRUE);
    }
    KvdFsDestroy(kvdCtx);
} else
    result = 1;
return result;
}
```

APPENDIX B

```
static int
kvdRead(const char *path, char *buf, size_t size, off_t offset, struct
fuse_file_info *fi) {
    int result;
    char pathBufr[KVD_PATH_LIMIT+1];
    KvdContext kvdCtx =
    (KvdContext)(fuse_get_context( )->private_data);
    if ( !normalPathname(path, pathBufr, sizeof(pathBufr)) )
        result = -EINVAL;
    else
        result = KvdFsRead(kvdCtx, pathBufr, buf, size,
        (uint64_t)offset);
    return result;
}
static struct fuse_operations kvdOperations = {
    .getattr    = kvdGetattr,
    .access     = kvdAccess,
    .readlink   = kvdReadlink,
    .readdir    = kvdReaddir,
    .mknod      = kvdMknod,
    .mkdir      = kvdMkdir,
    .symlink    = kvdSymlink,
    .unlink     = kvdUnlink,
    .rmdir      = kvdRmdir,
    .rename     = kvdRename,
    .link       = kvdLink,
    .chmod      = kvdChmod,
    .chown      = kvdChown,
    .truncate   = kvdTruncate,
    .utime      = kvdUtime,
    .open       = kvdOpen,
    .create     = kvdCreate,
    .read       = kvdRead,
    .write      = kvdWrite,
    .statfs     = kvdStatfs,
    .release    = kvdRelease,
    .fsync      = kvdFsync,
    .init       = kvdInit,
    .fgetattr   = NULL/*kvdFgetattr*/,
    .setxattr   = kvdSetxattr,
    .getxattr   = kvdGetxattr,
    .listxattr  = kvdListxattr,
    .removexattr= kvdRemovexattr,
    .destroy    = kvdDestroy
};
```

APPENDIX C

```
static int
kvdReadFile(LPCWSTR FileName, LPVOID Buffer, DWORD
BufferLength, LPDWORD
ReadLength,
            LONGLONG Offset, PDOKAN_FILE_INFO
            DokanFileInfo) {
    int result = 0, bytesRead = 0;
    char pathBufr[KVD_PATH_LIMIT+1];
        size_t bufrSize = BufferLength;
        uint64_t offset = (uint64_t)Offset;
    KvdContext kvdCtx =
    (KvdContext)(DokanFileInfo->DokanOptions->GlobalContext);
    if ( ReadLength )
        *ReadLength = (DWORD)bytesRead;
    if ( !BufferLength )
        ;
    else if ( !normalPathname(FileName, pathBufr, sizeof(pathBufr)) )
        result = -ERROR_INVALID_NAME;
    else if ( (bytesRead = KvdFsRead(kvdCtx, pathBufr, Buffer,
    bufrSize, offset)) < 0 ) {
        if ( bytesRead == -ENOLCK )
            result = -ERROR_LOCK_VIOLATION;
        else if ( bytesRead == -EIO )
            result = TRUE/*-ERROR_HANDLE_EOF*/;
        else
            result = -ERROR_FILE_NOT_FOUND;
```

APPENDIX C-continued

```
    } else if ( ReadLength )
        *ReadLength = (DWORD)bytesRead;
    return result;
}
/* VisualStudio's C compiler doesn't support the C99 "designated
initializer" syntax.
* So, statically initializing the following two structs must set field values
in order
* and their order must be checked when/if there's a Dokan library update.
*/
static DOKAN_OPERATIONS kvdDokanOperations = {
            /*.CreateFile =*/ kvdCreateFile,
            /*.OpenDirectory =*/ kvdOpenDirectory,
            /*.CreateDirectory =*/ kvdCreateDirectory,
            /*. Cleanup =*/ kvdCleanup,
            /*.CloseFile =*/ kvdCloseFile,
            /*.ReadFile =*/ kvdReadFile,
            /*.WriteFile =*/ kvdWriteFile,
            /*.FlushFileBuffers =*/ kvdFlushFileBuffers,
            /*.GetFileInformation =*/ kvdGetFileInformation,
            /*.FindFiles =*/ kvdFindFiles,
            /*.FindFilesWithPattern =*/ NULL,
            /*.SetFileAttributes =*/ kvdSetFileAttributes,
            /*.SetFileTime =*/ kvdSetFileTime,
            /*.DeleteFile =*/ kvdDeleteFile,
            /*.DeleteDirectory =*/ kvdDeleteDirectory,
            /*.MoveFile =*/ kvdMoveFile,
            /*.SetEndOfFile =*/ kvdSetEndOfFile,
      /* .SetAllocationSize = */ kvdSetAllocationSize,
            /*.LockFile =*/ kvdLockFile,
            /*.UnlockFile =*/ kvdUnlockFile,
        /*.GetDiskFreeSpace =*/ kvdGetDiskFreeSpace,
        /*.GetVolumeInformation =*/ kvdGetVolumeInformation,
            /*.Unmount =*/ kvdUnmount
};
```

What is claimed is:

1. A method comprising: by one or more computing devices, installing an application on at least a portion of a physical disk system associated with a first platform;

virtualizing the portion of the physical disk system into a virtual disk system, comprising:

storing data of the portion of the physical disk system in a database associated with the virtual disk system, wherein the database comprises one or more tables representing a hierarchical file system, one or more attributes, and one or more blocks of file content;

normalizing the one or more attributes, wherein normalizing the one or more attributes comprises normalizing at least one of a path, name, value, date and time of the data;

generating a platform neutral hierarchical file system based in part on the normalized one or more attributes;

providing an interface for user access to the data based, at least in part, on the one or more normalized attributes; and providing a plurality of sets of drivers associated with a plurality of platforms, wherein each set of drivers supports, for an associated one of the platforms, native operations with respect to the portion of the physical disk system;

receiving user input to mount the virtual disk system on a second platform, the user input comprising authentication information;

determining, based at least in part on the authentication information and one or more of a network location of the user, a current time, or a number of accesses to the virtual disk system, whether to mount the virtual disk system on a second platform;

in response to a positive determination, mounting the virtual disk system on the second platform; and executing the application on the second platform, wherein all operations associated with executing the application are contained within the virtual disk system mounted on the second platform, wherein executing the application on the second platform does not require any modification to the virtual disk system or to the data stored in the database of the virtual disk system.

2. The method of claim 1, wherein executing the application on the second platform uses the set of drivers provided in the virtual disk system corresponding to the second platform.

3. The method of claim 1, wherein executing the application on the second platform does not require any additional support outside of the virtual disk system from the second platform.

4. The method of claim 1, wherein the data stored in the database of the virtual disk system comprise content of one or more files in the portion of the physical disk system of the first platform and one or more attributes describing a structure of the portion of the physical disk system of the first platform.

5. A system comprising:

one or more processors; and a memory coupled to the processors comprising instructions executable by the processors, the processors being operable when executing the instructions to:

install an application on at least a portion of a physical disk system associated with a first platform;

virtualize the portion of the physical disk system into a virtual disk system, comprising:

storing data of the portion of the physical disk system in a database associated with the virtual disk system, wherein the database comprises one or more tables representing a hierarchical file system, one or more attributes, and one or more blocks of file content;

normalizing the one or more attributes, wherein normalizing the one or more attributes comprises normalizing at least one of a path, name, value, date and time of the data;

generating a platform neutral hierarchical file system based in part on the normalized one or more attributes;

providing an interface for user access to the data based, at least in part, on the one or more normalized attributes; and providing a plurality of sets of drivers associated with a plurality of platforms, wherein each set of drivers supports, for an associated one of the platforms, native operations with respect to the portion of the physical disk system;

receive user input to mount the virtual disk system on a second platform, the user input comprising authentication information;

determine, based at least in part on the authentication information and one or more of a network location of the user, a current time, or a number of accesses to the virtual disk system, whether to mount the virtual disk system on a second platform;

in response to a positive determination, mount the virtual disk system on the second platform; and execute the application on the second platform, wherein all operations associated with executing the application are contained within the virtual disk system mounted on the second platform, wherein the execution of the application on the second platform does not require any modification to the virtual disk system or to the data stored in the database of the virtual disk system.

6. The system of claim 5, wherein executing the application on the second platform does not require any additional support outside of the virtual disk system from the second platform.

7. The system of claim 5, wherein the data stored in the database associated with the virtual disk system comprise content of one or more files in the portion of the physical disk system of the first platform and one or more attributes describing a structure of the portion of the physical disk system of the first platform.

* * * * *